J. Lyon,
Sawing Stone.

Nº 22,605.   Patented Jan. 11, 1859.

Witnesses:
Lemuel W. Serrell
Thomas G. Harold.

Inventor:
James Lyon

UNITED STATES PATENT OFFICE.

JAMES LYON, OF NEW YORK, N. Y., ASSIGNOR TO JESSE J. DAVIS, OF SAME PLACE.

MACHINE FOR SAWING MARBLE.

Specification of Letters Patent No. 22,605, dated January 11, 1859.

*To all whom it may concern:*

Be it known that I, JAMES LYON, of the city and State of New York, have invented, made, and applied to use certain new and useful Improvements in Machinery for Monumental-Marble Sawing; and I do hereby declare that the following is a full, clear, and exact description of the construction and operation of the same, reference being had to the annexed drawing, making part of this specification, wherein—

Figure 2:
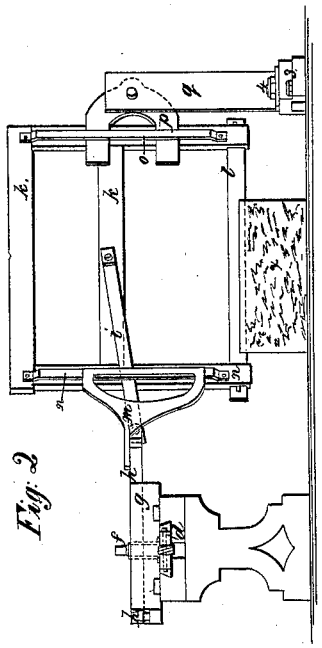
Figure 1:
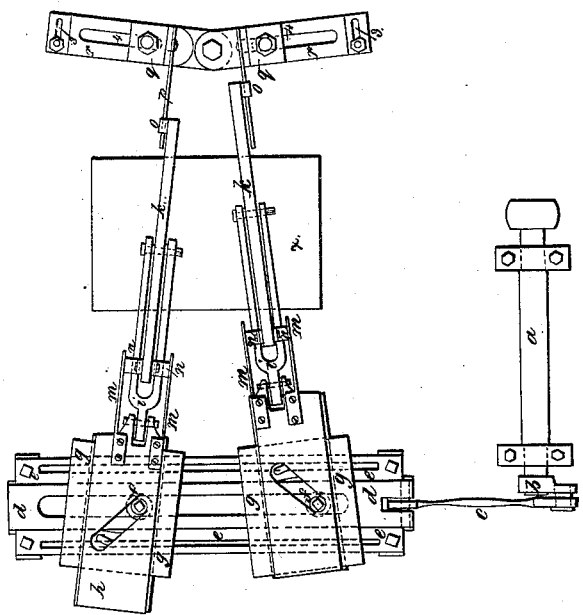

Figure 1, is a plan of my machine and Fig. 2 is a side elevation of the same.

Similar marks of reference indicate like parts.

The nature of my said invention consists in a reciprocating slide communicating motion by adjustable rollers acting in inclined slots to slides that are so fitted in adjustable frames that their positions can be varied as desired, and said slides being connected to the frames carrying the marble saws impart to the same a reciprocating movement; said saw frames being suitably supported and adjusted at the opposite end by movable standards and guide slides.

In the drawing $a$, is a shaft revolved by competent power, $b$, is a crank on the end thereof, and $c$, is a pitman or connecting rod to the slotted bar $d$, sliding in the V slides $e$, $e$.

Figure 3:
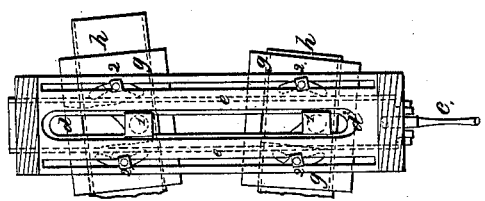

$f$, $f$, are rollers on vertical studs which are adjustable by a nut 1, (see inverted plan Fig. 3,) so that they can be located in any place along said slide $d$, as may be required according to the position of the saws.

$g$, $g$, are adjustable frames, attached by bolts 2, 2, in the slots of the slide bars $e$, $e$.

$h$, $h$, are slides set in said frames $g$ $g$ and having slots therein diagonal to their length, in which the rollers $f$, $f$, operate.

$i$, $i$, are connecting links from the slide $h$, to the saw frames $k$, $k$, carrying the saws $l$, $l$. I prefer that these links $i$, $i$, be formed double as shown so that they will pass on each side of each frame ($k$) and connect near the middle thereof. By means of this link the reciprocating movement, given to the slides $h$, by the rollers $f$, $f$ are communicated alternately back and forth to the respective saws and frames, and said link permits the saw to descend as the work progresses.

$m$, $m$, are side guides extending from the slides $h$, $h$, and located on each side of each frame and against the bars $n$, $n$, that are attached to said frames $k$, $k$, and intervene between the guide $m$, and the links $i$, $i$.

At the back end of each saw frame a vertical slot is formed between the frame and a bar $o$, in which are the forks of the guide slide $p$, that is attached to a vertical standard $q$, said standard being adjustable lengthwise (at 4,) of a bearing block $r$, which block itself can be turned horizontally and clamped by the screw 3, so as to accommodate the angle of the saw. Each saw being thus fitted the operation of adjusting is as follows: Take the block of marble ($x$) with the monumental lines marked thereon, let the same rest on a firm bed within range of the saws, loosen the screws 1, 2, 3, 4, and the whole saw frame is free to be moved at either end until the saw corresponds with the line to be cut, then tighten the screws 2, 3 and 4, adjust the roller $f$, so that its movement will be within the length of slot in the slide $h$. This being done with both saws the machine is ready for work in the ordinary way.

By this arrangement of devices a very compact machine is produced, and one that is very strong, durable and easily adjusted; at the same time long connecting rods, bands or similar parts that occupy much valuable space in a factory are dispensed with.

What I claim as my invention and desire to secure by Letters Patent is—

The arrangement of the reciprocating bar $d$, adjustable rollers $f$ $f$, adjustable frames $g$, $g$, and diagonally slotted slides $h$, $h$, in relation to each other and to parts that connect with and guide the saws, for the purposes and substantially as specified.

In witness whereof I have hereunto set my signature this ninth day of December 1858.

JAMES LYON.

Witnesses:
LEMUEL W. TERRELL,
THOMAS G. HAROLD.